MULTIPULSE CURRENT DRIVER COMPRISED OF A PLURALITY
OF STAGES, EACH OF WHICH HAS
A HIGH Q AT RESONANCE
Filed Feb. 8, 1965

INVENTORS
JAMES A. BAER
CLARENCE H. HECKLER
BY Samuel Lindenberg
Abraham Wassermann
ATTORNEYS United States Patent Office 3,435,431
Patented Mar. 25, 1969

3,435,431

MULTIPULSE CURRENT DRIVER COMPRISED OF A PLURALITY OF STAGES, EACH OF WHICH HAS A HIGH Q AT RESONANCE

Clarence H. Heckler, Palo Alto, and James A. Baer, Menlo Park, Calif., assignors to Stanford Research Institute, Menlo Park, Calif., a corporation of California Filed Feb. 8, 1965, Ser. No. 430,949
Int. Cl. G11b *5/44;* G11c *11/02;* H03k *3/28*
U.S. Cl. 340—174 14 Claims

ABSTRACT OF THE DISCLOSURE

A multipulse driver, for sequentially providing driving current pulses to a plurality of magnetic circuits, is disclosed. The driver comprises a plurality of driving stages arranged in a sequence, each stage used to be coupled to supply driving pulses to a different one of the magnetic circuits. Each stage includes an inductor and a capacitor, which together have a high Q at resonance to provide a high impedance in order not to affect the driving pulse supplied to the magnetic circuit despite variation thereof. Each stage is further provided with a switching circuit in the form of a pulsactor, arranged so that each stage absorbs only the energy necessary to produce the driving pulse, supplying the excessive energy for use by succeeding stages in the sequence.

This invention relates to multipulse current driving circuits and, more particularly, to improvements therein.

Pulse timing techniques, whereby pulses initiate or time a series of electronic operations, are extensively used in present-day electronic systems. The use of such techniques is particularly widespread in digital computers, wherein register circuits comprising elements such as magnetic cores and the like are driven by trains of current pulses which control the storing and/or shifting of data which is stored as the magnetic states of such elements.

Since the operation of such circuits used in digital computers is interrelated, it is preferable to be able to drive a plurality of such circuits with pulses from a single pulse source, to which such circuits can be conveniently coupled. For example, some presently known magnetic core shift registers are driven by a sequence of pulses, which is generally supplied from a plurality of sources, though it is preferable to supply such a sequence of pulses from a single source. Furthermore, in driving such magnetic core shift registers, it is important that the amplitude of current in each drive current pulse be maintained constant. This is difficult to achieve since the load presented to the driving source varies with time and the type of information contained in the register. Various complicated power supplies have been built for driving magnetic core shift registers in an attempt to achieve constant current power source. These all effectively comprise high impedance power sources. Quite often a resistance is put in series with a low impedance source to minimize the effect of load variation. However, the additional source impedance results in dissipation of considerable power.

Accordingly, it is an object of the present invention to provide a novel and efficient multipulse current driver circuit which effectively operates as a high impedance constant current source.

Another object of the invention is the provision of a current driver circuit to which a plurality of current pulse driven loads may be conveniently coupled, with the driver circuit presenting a high impedance to each of the loads.

A further object of the invention is to provide a unique and simple multipulse current driver which can most efficiently drive a plurality of loads such as magnetic core circuits.

These and other objects of the invention are achieved in a driver comprising a plurality of stages, each stage having a pair of output terminals from which current pulses are available to a magnetic load which may be coupled thereto. Components in each stage are selected so that the stage possesses a high Q value, thereby presenting a high impedance to any load which may be coupled thereto. Consequently, the changes in the information state in any of the loads does not appreciably affect the magnitude of the pulse current supplied thereto, and therefore the current is substantially of a constant magnitude. All of the stages are serially connected and are driven from one end by a power supply. Any energy which is not absorbed in any of the stages is transferred to the succeeding stage so as to be used by the magnetic load coupled thereto. Thus, each stage drives the load coupled thereto and supplies any unused energy to the succeeding stage. The serially connected stages may either be terminated in a critically damping resistor, or a feedback connection may be employed whereby any energy that has not been dissipated in the plurality of the loads connected to the various stages, is fed back to the current source. Thus, when employing the feedback arrangement, the power supply driving the plurality of stages need only supply the energy actually absorbed by the various magnetic loads coupled to the various stages. Consequently, the amount of energy that need be supplied to the driver to drive the various magnetic loads is minimized, and the high impedance characteristics of each of the driver stages enable each magnetic load to be driven with current pulses having amplitudes which are not affected by the information states in any of the loads.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
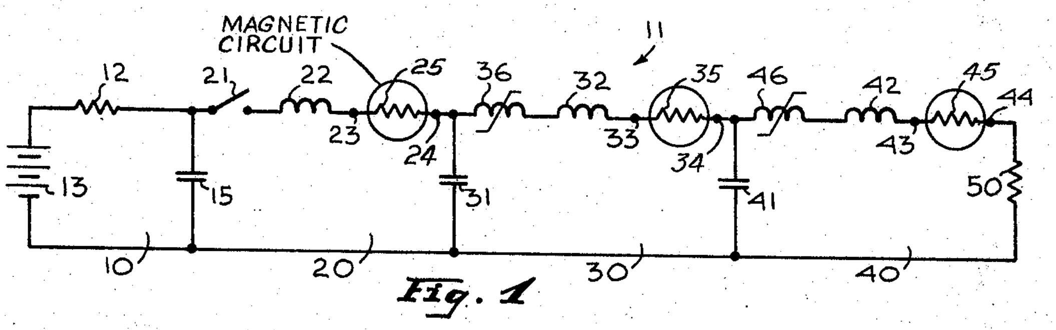
FIGURE 1 is a schematic diagram of one embodiment of the present invention.

Reference is now made to FIGURE 1 which is a schematic diagram of one embodiment of a multipulse current driver 11 of the present invention. The driver 11 comprises an input stage 10 and driving stages 20, 30, and 40, stage 40 representing the last driving stage of a three stage driver. The input stage 10 comprises serially connected resistor 12 and capacitor 15, connected across a source of power, such as a battery 13. The capacitor 15 acts as the source of power to the succeeding driving stage 20. Stage 20 comprises a normally open switch 21 connected between the junction of the resistor 12 and the capacitor 15, and one terminal of an inductor 22. The other terminal of inductor 22 is connected to an output terminal 23 which serves as one of the terminals to which a magnetic circuit, diagrammatically represented by the resistive load 25, is connected. The resistive load 25 is also connected to a second output terminal 24 which is directly connected to one end of a capacitor 31, the other end of the capacitor 31 being connected to the source of power 13. Thus, capacitors 15 and 31, inductor 22, the resistive load 25 and the normally open switch 21 form the driving stage 20 of the driver 11.

In operation, as long as the switch 21 remains open, the capacitor 15 charges up to the potential of battery 13 and remains charged. However, as soon as switch 21 is momentarily closed, the capacitor 15 discharges through the inductor 22 and the resistive load 25, thus providing a current pulse to the resistive load. Capacitors 15 and 31 and inductor 22 are chosen so that together with the resistive load 25 representing the resistive load of the magnetic circuit connected to stage 20, they have a high Q value at resonance, thereby exhibiting a high source impedance to the magnetic circuit represented by the resistive load 25.

The significance of the impedance that a pulse source presents to its load is appreciated by those familiar with the art of digital magnetic circuitry. Generally, when a digital magnetic circuit is driven by a pulse source in order to store or transfer digital information, it is important that the impedance of the source be sufficiently high so that the amplitude of the pulse be independent of the state of the information in the magnetic circuit. It is also important that the impedance of the pulse source be high even when pulses are not supplied to the magnetic circuit, namely during the interpulse period. Such high impedance during the interpulse period is necessary in order to minimize the flow of current as a result of the magnetic circuit responding to pulses from other sources.

Figure 2:
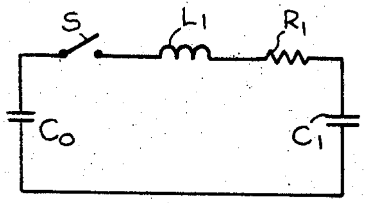
FIGURES 2 and 3 are schematic diagrams useful in explaining the impedance characteristic of each stage of the multipulse current driver of the present invention.

The high impedance characteristics of stage 20 of driver 11 during pulse generation may best be understood by analyzing the operation of the circuit shown in FIGURE 2 to which reference is made herein. In FIGURE 2, capacitors $C_0$ and $C_1$ are similar to capacitors 15 and 31 respectively, and the inductor $L_1$ is similar to inductor 22 of stage 20. Resistor $R_1$ represents the load presented to the driving stage by the magnetic circuit and the inherent circuit losses, and therefore is similar to the resistive load 25 shown in FIGURE 1. Let it be assumed that the capacitor $C_0$ is charged to E volts which represents the potential or voltage of the battery 13. Thereafter, a switch S is closed for a time interval equal to $$\pi/\omega_0$$

and $$\omega_0=\sqrt{\frac{C_0+C_1}{L_1C_1C_0}-\frac{R_1^2}{4L_1^2}}$$

and is then opened. During this interval, all the charge from capacitor $C_0$ is transferred to capacitor $C_1$. This can be effected by satisfying $$\frac{C_0}{C_1}=\epsilon^{-\pi/2Q_0} \qquad (1)$$

where $$Q_0=\frac{\omega_0 L_1}{R_1}$$

Thus, the current pulse that occurs during this transfer may be represented by $$i_p=\frac{E}{\omega_0 L_1}\epsilon^{-\frac{R_1 t}{2L_1}}\sin\omega_0 t \qquad (2)$$

where $t$ is restricted to the interval $$O\leqslant t\leqslant \pi/\omega_0$$

From Equation 2, it is seen that if $Q_0$ is 20, the peak current $i_p$ is only 4% less than it is when $Q_0$ is equal to infinity. Thus, if load variations are such that $Q_0$ is never less than 20, then the peak current would only vary by not more than 4%. Namely, the circuit can be made to be substantially independent of variations in the load thereby providing the load with a current pulse of substantially constant amplitude.

Figure 3:
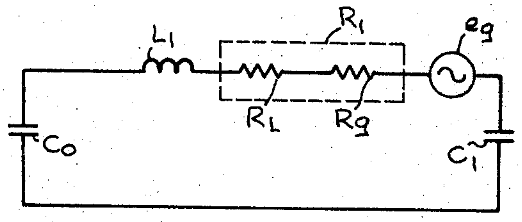

For an explanation of the impedance of the circuit presented during the interpulse interval, reference is made to FIGURE 3 in which an arrangement is presented, similar to that shown in FIGURE 2, except for switch S. The arrangement in FIGURE 3 also represents a midsection of the circuit shown in FIGURE 1. In FIGURE 3, resistors $R_g$ and $R_L$ equal the resistance of resistor $R_1$ shown in FIGURE 2. $R_g$ represents that portion of $R_1$ which is due to the switching of the magnetic cores. $R_L$ represents the resistance of the wire that connects to the magnetic cores. The arrangement in FIGURE 3 further includes a potential source $e_g$ which represents the voltage produced by the magnetic cores in the load which are being switched from other sources. If, during the interpulse interval, the same core switching occurs as that which takes place during the pulse interval (except for direction), then $e_g$ is equal to the product of $i_p \times R_g$, with $i_p$ being defined by Equation 2. Assuming as an approximation that $e_g$ is half a sine wave, namely $$e_g=V_m \sin\omega_0 t \qquad (3)$$

then, for the high $Q_0$ case, the current during the interpulse interval may be expressed by the following relationship:

$$i_1=\frac{V_m}{R_1}\left\{1-\epsilon^{-\frac{R_1 t}{2L_1}}\right\}\sin\omega_0 t \qquad (4)$$

where $t$ is restricted to the interval $$O\leqslant t\leqslant \pi/\omega_0$$

The ratio of the peak current in the circuit during the interpulse period to that of the power pulse itself is $$\frac{i_1}{i_p}=\frac{(V_m/R_1)\left(1-\epsilon^{-\frac{R_1 t}{2L_1}}\right)}{V_m/R_g} \qquad (5)$$

Since $R_1$ is greater than $R_g$, it is seen from Equation 5 that for a $Q_0$ which is equal to 20, the current peak in the interpulse period is less than 4% of that of the power pulse itself. Thus, the multipulse driving stage presents a high impedance to the magnetic circuit during the interpulse interval as well as during the pulse generation. Consequently, the amount of current that flows through the stage as a reaction to cores being switched in the magnetic load by other pulse sources is greatly minimized.

From the foregoing, it is thus seen that by selecting the components of a driving stage, such as stage 30, to have a high Q at resonance, the stage presents a high impedance to the magnetic circuit represented by the resistive load 35. Such high impedance minimizes the effect of changes of the load on the amplitude of the current pulses supplied thereto and thereby provides a substantially constant current source of high impedance. According to the teachings of the present invention, the capacitor 31 is used as the power source for the succeeding driving stage 30 which comprises an inductor 32, a capacitor 41 and a pair of terminals 33 and 34 to which another magnetic circuit, diagrammatically represented by the resistive load 35, may be connected. The stage 30 also includes a pulsactor 36 which is connected between the inductor 32 and the capacitor 31.

The pulsactor 36 is basically a resistance type switch with a core made of square loop magnetic material which has two states of magnetic saturation. In operation, when the magnetic circuit represented by the resistive load 25 is driven by a current pulse provided by the discharging capacitor 15, initially substantially no current flows through the pulsactor 36. Most of the energy from the discharging capacitor 15 which is not absorbed in the resistive load 25 is used to charge up capacitor 31. The pulsactor 36, during this time period, acts as substantially an open switch. As energy builds up in the capacitor 31, current commences to flow through the pulsactor 36 until it is suddenly switched to its reverse state of saturation thereby providing a discharge path for the energy of the capacitor 31. Consequently, a pulse of current is provided to driving stage 30 which drives the magnetic circuit represented by the resistive load 35.

Any energy which is not absorbed in the resistive load 35 is used to charge up the capacitor 41 which, as seen from FIGURE 1, acts as the power source for the next succeeding driving stage 40. Stage 40 is similar to the preceding stage 30 in that it comprises pulsactor 46, an inductor 42 and a pair of output terminals 43 and 44 to which a magnetic circuit represented by the resistive load 45 is connected. The driving stage 40, being assumed to be the last stage of the driver circuit 11, terminates in a critically damping resistor 50. As capacitor 41 continues to charge up by the energy not absorbed in stage 30, some current commences to flow through the pulsactor 46, until the magnetic core thereof is suddenly switched to reverse satauration thereby providing a low impedance discharge path for the energy stored in capacitor 41. Thus, a current pulse is provided in driving stage 40 which is supplied to the magnetic circuit represented by the resistive load 45. Any energy which is not absorbed in the resistive load 45 dissipates in the damping resistor 50.

From the foregoing description, it is to be appreciated that the multiple current driver 11 of the present invention can be operated most efficiently, since any energy not absorbed in any of the driving stages is utilized to provide current pulses in succeeding driving stages. In addition, the choice of components in each of the driving stages is controlled to insure that each stage has a high Q at resonance, thus preventing a high impedance to the magnetic circuit to be driven thereby. Such high impedance is most advantageous when driving magnetic circuits with current pulses since the changes in the magnetic circuit do not affect the amplitude of the current pulses supplied thereto.

Figure 4:
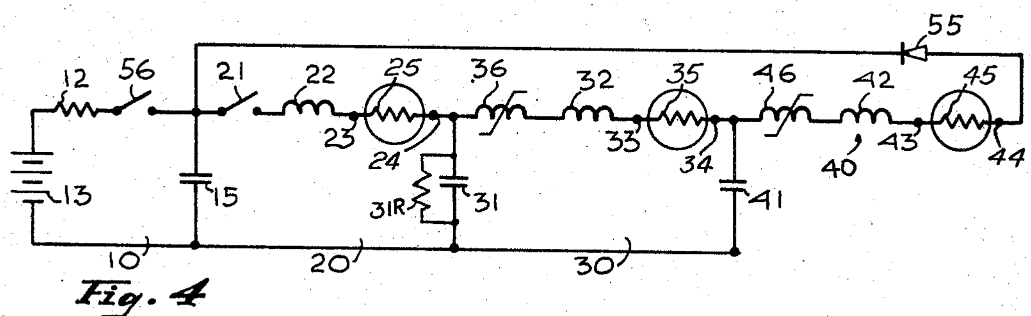
FIGURE 4 is a schematic diagram of another embodiment of the present invention.

Reference is now made to FIGURE 4 which is a schematic diagram of another embodiment of a multipulse current driver of the present invention. As seen from FIGURE 4, the driving stage 40 which is assumed to be the last stage of the driver, does not terminate with the critically damping resistor 50. Rather, the stage 40 is connected, through a diode 55, to the junction point between the capacitor 15 and the switch 21. Also in the present embodiment of the invention, a switch 56 is disposed between the resistor 12 and the capacitor 15 in the input stage 10, and a bleeding resistor 31R is connected across capacitor 31 to provide a discharge path for any charge accumulated thereat.

Initially, switches 21 and 56 are open (as shown), so that capacitor 15 does not store any energy. To initiate a chain of current pulses, switch 56 is closed, thereby enabling capacitor 15 to charge up to the voltage of battery 13. Thereafter, by closing switch 21, a chain of pulses is generated as hereinbefore described. Any energy which is not dissipated in the driving stages 20, 30 and 40, rather than being absorbed in the terminating resistor 50 is fed back through the diode 55 to the capacitor 15. Thus, any non-dissipated energy is used to recharge the capacitor 15 so that with any additional energy from the source 13, a subsequent chain of current pulses may be initiated. It should be pointed out that for proper energy feedback to occur, switches 21 and 56 must be open when such feedback energy is supplied through the capacitor 15.

It should be pointed out that whenever the multipulse current driver shown in FIGURE 4 is operated in a low duty cycle, namely the time constant equaling the product of the capacitor 15 and resistor 12 is much larger than the time required for a single chain of pulses to propagate through the plurality of stages, switch 56 may be eliminated. Under such conditions, capacitor 15 may be connected directly to resistor 12 since, with a long time constant, by the time the non-dissipated energy is fed back to the capacitor 15, it has only acquired a new relatively small charge from the battery 13 and therefore the situation is analogous as if switch 56 were open.

As seen from FIGURES 1 and 4, each of the driving stages (except the first stage) includes a pulsactor which controls the supply of a current pulse to the magnetic circuit coupled to its stage in a manner as hereinbefore described. After a pulse has propagated through the multipulse current driver, all the pulsactors in the various stages must be returned to their initial state before another pulse chain can be generated through the driver. Returning the pulsactors to their initial state, or resetting, can be accomplished in several ways. For example, each pulsactor may be provided with an additional reset winding which is energized by energy from a resetting pulse source whenever it is desired to reset the pulsactor or return it to its initial state. Such a resetting arrangement, though quite straightforward, may not always be practical since it requires additional windings for each of the pulsactors as well as additional power which is necessary to produce the resetting pulses so as to return the pulsactors to their initial state.

Figure 5:
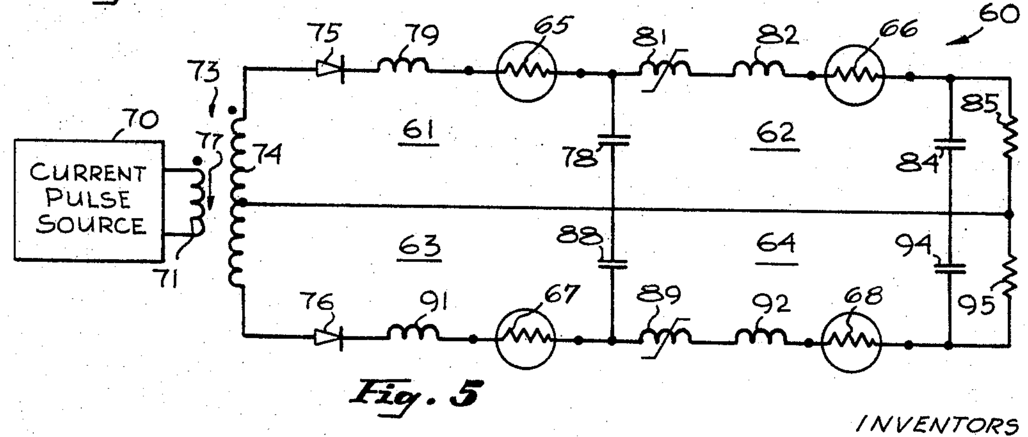
FIGURE 5 is a specific embodiment of a four pulse current driver of the present invention.

Reference is now made to FIGURE 5 which is a schematic diagram of a four stage multipulse current driver 60. The four stages are designated by numerals 61 through 64. Resistive loads 65 through 68 diagrammatically represent four magnetic circuits which are coupled to stages 61 through 64 respectively so as to be driven by current pulses supplied therefrom. As seen from FIGURE 5, a current pulse source 70 is connected to a primary winding 71 of a transformer 73 having a secondary winding 74 connected to stages 61 and 63. One-half of the secondary winding 74 forms a part of stage 61 whereas the other half of the winding 74 forms a part of stage 63. Stages 61 and 63 include diodes 75 and 76 respectively so that when a current through primary winding 71 flows in a first direction, a corresponding current is induced in one of the two stages, and when the current through the primary winding 71 flows in an opposite direction, a current is induced in the other stages. Let us assume that a current in the winding 71 flows in the direction indicated by arrow 77, thereby inducing a pulse in stage 61. Such a current pulse is supplied to the magnetic circuit represented by the resistive load 65. As previously explained, any energy which is not absorbed in driving the resistive load 65 is stored in a capacitor 78 which forms a part of stage 61 as well as acting as a source of power for the succeeding stage 62. Stage 61 also includes an inductor 79 which is chosen so that, together with capacitor 78 and the one-half of the secondary winding 74, has a high Q at resonant so that stage 61 presents a high impedance to the magnetic circuit represented by resistive load 65.

Stage 62 to which a magnetic circuit represented by resistive load 66 is connected includes a pulsactor 81, an inductor 82 and a parallelly connected capacitor 84 and resistor 85. From the foregoing description, it is seen that capacitor 78 will continue to charge up until pulsactor 81 will be switched from its initial state thereby providing a discharge path for the capacitor 78. Consequently, a pulse will be produced in stage 62 which will be supplied to the magnetic circuit represented by resistive load 66. Any energy not absorbed in the resistive load 66 is used to charge capacitor 84. The resistance of resistor 85 is chosen to be high enough so that the pulse shape and amplitude of the current pulse supplied to the resistive load 66 is essentially the same as if resistor 85 were removed from the circuit. After capacitor 84 is charged up by any energy not absorbed in the resistive load 66, the discharge of capacitor 84 takes place through resistor 85 and through capacitor 78 as well as pulsactor 81. The current amplitude during this discharge period passing through the pulsactor 81 is enough to slowly reset the pulsactor, but is small enough so that the magnetic circuit represented by the resistive load 66 is not affected. The resistance of resistor 85 is selected so that capacitor 84 is completely discharged by the time the pulsactor 81 is reset. The small charge which accumulates on capacitor 78 leaks out through pulsator 81 with negligible effect on the circuit operation. Thus, pulsactor 81 is reset without the need of an auxiliary reset winding or an additional source of power necessary to drive such an auxiliary winding.

When current pulse source 70 energizes primary winding 71 with a current pulse which flows in the direction opposite to that indicated by the arrow 77, a pulse is impressed in stage 63 which after driving the magnetic circuit represented by resistive load 67, is used to charge up a condenser 88. After condenser 88 charges up to a proper level, pulsactor 89 is switched to enable the pulse to be supplied to a magnetic circuit represented by the resistive load 68. Stage 64 further includes a capacitor 94 and resistor 95 which operate in a manner similar to capacitors 84 and 85 for resetting pulsactor 89 in a manner previously explained. Stages 63 and 64 include inductors 91 and 92 respectively, each inductor being selected so that together with the other components within each stage, a high impedance is presented to the magnetic circuit coupled to such stage. Current pulse source 70 is designed to provide the primary winding 71 with a train of current pulses, with successive pulses flowing in opposite directions through the winding. Each pulse in the train initiates a chain of current pulses through another group of driving stages. The source 70 may comprise a pair of transistorized stages which operate in a binary fashion. Namely, when one transistor stage is activated, the other is deactivated. Thus one stage may supply the current pulses to the winding 71 which flow in one direction, whereas the second stage may supply the pulses flowing in the opposite direction.

There has accordingly been shown and described herein a novel and useful multipulse current driver comprised of a plurality of stages. Each stage is adapted to be connected to a magnetic circuit in order to drive it with a current pulse produced therein. The components in each stage are selected to insure that the stage has a high Q at resonance and thereby present a high impedance to the magnetic circuit coupled to it. The stages are intercoupled in order to provide a highly efficient driver by using the energy that remains in each stage after the generation of a current pulse therein, to provide subsequent current pulses in the succeeding stages of the driver. Thus, energy transfer takes place as pulses are sequentially generated in succeeding stages of the driver.

It should be appreciated that some modifications may be introduced in the circuits as shown without departing from the spirit of the invention. For example, the pulsactors, shown incorporated in the series branches of the various stages, with the capacitors shown in the shunt branches may be interchanged so that the pulsactors may be connected in the shunt branches and the capacitors in the series branches. Also, the function of the pulsactors may be similarly performed by other devices such as transistorized circuits. Similarly, the resistor used to control the first capacitor may be replaced by an appropriate inductor. Therefore, all such modifications and equivalents are deemed to fall within the scope of the invention as claimed in the appended claims.

What is claimed is:

1. A multipulse circuit for sequentially providing current pulses to a plurality of current-pulse-driven circuits coupled thereto comprising a plurality of driving stages arranged in a sequence each stage including capacitive and inductive means serially connected to one of said current-pulse-driven circuits and selected to have a Q of a predetermined value at resonance to have a high impedance with respect to the circuit coupled thereto; and means for providing energy to the first stage to produce a current pulse in each stage in said sequence to drive the circuit coupled thereto with the energy which is not dissipated in the preceding stages thereof.

2. A multipulse circuit for sequentially providing pulses to a plurality of current-pulse-driven circuits coupled thereto comprising a sequence of driving stages, each stage including inductive means and capacitive means connected in series with one of said circuits to provide a high impedance with respect to the circuit coupled thereto; means for providing a pulse to the circuit connected to the first stage in the sequence and for storing energy not dissipated therein in the capacitive means connected across output terminals thereof; and switching means included in each of the stages succeeding said first stage for controlling the discharge of energy stored in the capacitive means connected across the input terminals thereof to provide a pulse to the current-pulse-driven circuit coupled thereto, and charge of the capacitive means connected across the output terminals thereof and the input terminals of a succeeding stage with energy not dissipated therein.

3. A multipulse circuit for sequentially providing pulses to a plurality of current-pulse-driven circuits coupled thereto comprising a plurality of stages arranged in a sequence, each stage including an input terminal and an output terminal, switching means, inductive means and means for connecting said switching means, inductive means and one of said circuits in series between said input and output terminals; a source of energy; means for connecting said source of energy to the input terminal of the first stage in said sequence, and a plurality of capacitive means each of which is connected to the output and input terminals of adjacent succeeding stages in said sequence, for storing in each of said capacitive means energy from said source which is not dissipated in the preceding stages thereof and for supplying the energy stored therein to the succeeding stage to provide a pulse to the current-pulse-driven circuit connected thereto the supply of said energy being controlled by the switching means of said stage.

4. A multiple circuit as recited in claim 3 wherein the inductive means of each stage together with the capacitive means connected therebetween and a succeeding stage exhibit a high Q at resonance to have a high impedance with respect to the current-pulse-driven circuit connected thereto.

5. A multipulse circuit as recited in claim 4 further including means connected to the last stage of said sequence for feeding back to said source of energy, energy which is not dissipated in the sequence of stages and the current-pulse-driven circuits connected thereto.

6. A multipulse current driver for sequentially providing current pulses to each of a plurality of current-pulse-driven circuits coupled thereto comprising a plurality of stages, each stage having terminal means for coupling one of said current-pulse-driven circuits thereto in series with inductive and capacitive components thereof; means for successively interconnecting said stages with the capacitive component of each stage connected across the input of preceding stages thereof; a source of energy; means for charging the capacitive component of the first stage of said plurality of stages with energy from said source; and switching means for discharging the capacitive component of said first stage to provide a current pulse for driving the circuit coupled to said first stage and for charging the capacitive component of the succeeding stage with energy not dissipated in said first stage, each of the remaining stages further including magnetic switching means with a core of magnetic material having substantially square hysteresis characteristics for controlling the discharge of energy from the capacitive means of each stage to provide a current pulse for driving the circuit coupled thereto, and for charging the capacitive component of the succeeding stage with energy not dissipated in the succeeding stages thereof, the inductive and capacitive components of each stage together with the capacitive component of the immediately succeeding stage having a high Q at resonance to have a high impedance with respect to the current-pulse-driver circuit coupled thereto.

7. A multipulse current circuit as recited in claim 6 further including means coupled to the last stage of said plurality of stages for utilizing the energy discharged from the capacitive means of said first stage which is not dissipated in said plurality of stages, the Q value of each stage being in the range of 20.

8. A multipulse current circuit as recited in claim 6 further including feedback means interposed between the last stage of said plurality of stages and said capacitive means of said first stage for charging said capacitive means with the energy not dissipated in said plurality of stages.

9. A multipulse driver for sequentially providing pulses to a plurality of multicore magnetic circuits wherein information is storable comprising, a plurality of stages arranged in a sequence, each stage having terminal means for coupling one of said plurality of circuits thereto, each stage further including capacitive means coupled to the output of a preceding stage in said sequence; means for energizing the first stage in said sequence to provide a first pulse to the circuit coupled thereto and for storing energy of said first pulse not dissipated in said first stage and the circuit coupled thereto in the capacitive means of the succeeding stage; and means included in each of the stages succeeding said first stage for controlling the discharge of energy stored in the capacitive means of each stage to control the pulse provided therein for driving the circuit coupled thereto and for controlling the energy stored in the capacitive means of the succeeding stage, each stage further including inductive means coupled in series with capacitive means and the circuit coupled thereto, said inductive means together with the capacitive means thereof and the capacitive means of the immediately succeeding stage exhibit a high Q to control the impedance of the stage with respect to the multicore magnetic circuit coupled thereto.

10. A multipulse driver as recited in claim 9 wherein said means included in each of the state comprises a pulsactor having a core of magnetic material with two stable states of magnetization so that when said pulsactor is in a first state, the energy not absorbed in a preceding stage charges up the capacitive means of the stage of said pulsactor, to a level sufficient to switch said pulsactor to a second of said two stable states of magnetization, so as to produce a pulse in said stage by providing a discharge path for the energy stored in the capacitive means of said stage, and the Q exhibited by the inductive and capacitive means of each stage at resonance being in the range of twenty.

11. A multipulse driver for providing driving pulses to a plurality of magnetic circuits wherein information is storable, comprising a plurality of driving stages arranged in a first and second sequence, each stage including means for coupling another of said magnetic circuits thereto, each stage succeeding the first stage further including capacitive means coupled to a preceding stage; pulse source means electrically coupled to the first stages in said first and second sequences for providing in response to an input pulse conducting in a first direction a first pulse to the first stage in said first sequence and for storing excessive energy of said first pulse in the capacitive means of a succeeding stage in said first sequence, and for providing in response to an input pulse conducting in a direction opposite to said first direction a second pulse to the first stage in said second sequence and for storing energy of said second pulse not absorbed in said first stage of said second sequence and the magnetic circuit coupled thereto in the capacitive means of a succeeding stage in said second sequence; and control means including in each succeeding stage in said first and second sequences for controlling the discharge of the capacitive means thereof to control the pulse produced in the stage and the energy stored in the capacitive means of a succeeding stage, each stage further including inductive means which together with the capacitive means thereof and the capacitive means of the succeeding stage have a high Q at resonance to control the impedance of said stage wtih respect to the magnetic circuit coupled thereto.

12. A multipulse driver as recited in claim 11 wherein said control means included in each of the stages comprises a pulsactor having a core of magnetic material with two stable states of magnetization so that when said pulsactor is in a first state, the energy not absorbed in a preceding stage charges up the capacitive means of the stage of said pulsactor, to a level sufficient to switch said pulsactor to a second of said two stable states of magnetization, so as to produce a pulse in said stage by providing a discharge path for the energy stored in the capacitive means of said stage.

13. A multipulse driver as recited in claim 12 further including means for resetting the pulsactor in each of said stages from said second state to said first state of said two stable states of magnetization.

14. A multipulse driver as recited in claim 11 further including means for utilizing the energy not dissipated in the stages of said first and second sequences in providing subsequent pulses to the first stages thereof.

References Cited

UNITED STATES PATENTS

| | | | |
|---|---|---|---|
| 2,758,221 | 8/1956 | Williams | 307—88 |
| 3,046,419 | 7/1962 | Raber | 307—106 |
| 3,193,693 | 7/1965 | Daykin | 307—106 XR |
| 3,211,915 | 10/1965 | Poehlman et al. | 307—106 XR |
| 3,219,987 | 11/1965 | Kelner | 340—174 |
| 3,329,830 | 7/1967 | Disson | 340—174 XR |

FOREIGN PATENTS

| | | |
|---|---|---|
| 845,445 | 8/1960 | Great Britain. |

BERNARD KONICK, *Primary Examiner.*

GARY M. HOFFMAN, *Assistant Examiner.*

U.S. Cl. X.R.

307—88, 106